March 12, 1929.   P. YANNETTA   1,705,167
LINE CLAMP
Filed March 6, 1928

Peter Yannetta
INVENTOR.

BY James F. Splain.
ATTORNEY.

WITNESS

Patented Mar. 12, 1929.

1,705,167

UNITED STATES PATENT OFFICE.

PETER YANNETTA, OF WATERBURY, CONNECTICUT.

LINE CLAMP.

Application filed March 6, 1928. Serial No. 259,491.

My present invention has to do with means for fastening or attaching lines; and it has for its object the provision of a device adapted to be attached of itself to a clothes line or other line in adjustable manner and to serve for the connection of the line in a secure manner to a hook or other anchoring or holding element.

To the attainment of the foregoing the invention consists in the improvement as hereinafter described and definitely claimed.

In the accompanying drawings, forming part of this specification:—

Similar numerals of reference designate corresponding parts in all views of the drawings.

Figure 1:
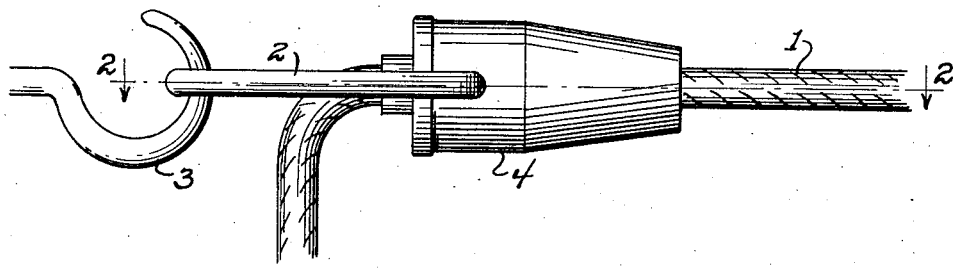
Figure 1 is a side elevation showing the preferred embodiment of my invention in use.
Figure 2:
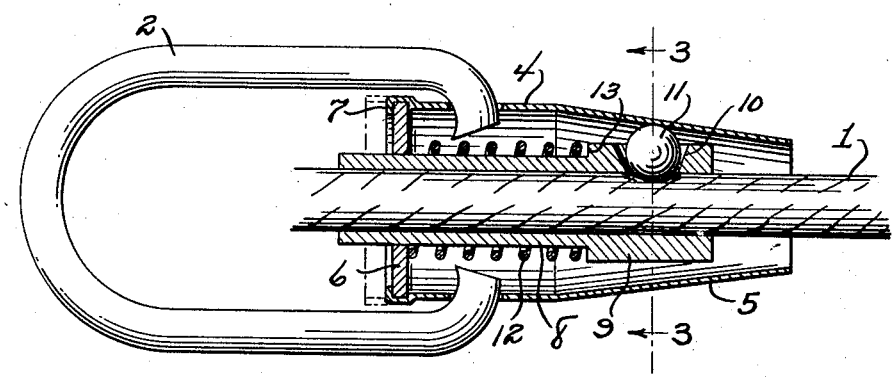
Figure 2 is an enlarged sectional view showing the line and fastener.

I show in Figures 1 and 2 a line 1 which may be a clothes line or a line of some other description without affecting my invention.

Figure 3:
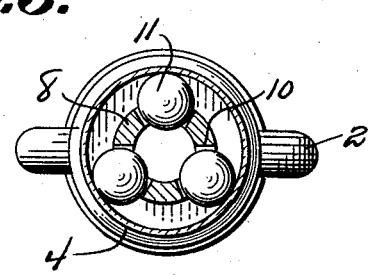
Figure 3 is a transverse section taken in the plane indicated by the line 3—3 of Figure 2.

I also show in Figures 1, 2 and 3 the fastener constituting the preferred embodiment of my invention, the bail 2 of the fastener being shown in Figure 1 as looped over a hook 3 which is an example of an anchor to which the line 1 may be attached.

In addition to the bail 2 my novel device comprises a hollow casing 4 with a tapered portion 5, the taper being essential at the inner side of said portion 5. The ends of the bail 2 are let into the casing 4 after the manner best shown in Figure 2 and consequently the connection of the bail to the casing is a pivot connection.

The heel end of the casing 4 is closed by an annulus 6 held at 7 in and to the casing 4, and extending through the said annulus 6 is the slidable member 8 of my improvement, the said slidable member being tubular in form to receive the cable 1 as illustrated in Figure 2, and being enlarged at 9 and being provided in said enlargement with a plurality of, preferably three radial apertures 10. The said apertures 10 are for the reception of balls 11 which are retained in the apertures and are arranged to operate against the inner side of the tapered portion 5 of the casing.

Within the purview of my invention any number of balls 11 may be employed without affecting my invention as claimed.

With the line 1 threaded through the tubular member 8 in the manner shown in Figure 2, and a spring 12 coiled about said member 8 and interposed between the annulus 6 and an abutment 13 of the tubular member, it will be readily discernible that pull on the line 1 toward the right in Figure 2 will operate to move the balls 11 in a corresponding direction so that the balls will be wedged against the line 1 for the secure holding of the latter, and it will also be observed that the greater the pull toward the right on the line 1 the more strongly will the line be held. It will be appreciated however that when tension on the line 1 is relaxed the line may be moved toward the left in Figure 2, and from this it follows that when occasion demands my novel fastener may be expeditiously and easily adjusted relative to the line.

It will be apparent from the foregoing that when the body or casing 4 of my novel device is connected through the medium of the bail to a stationary hook such as 3 or the like, my novel device will serve not only to tightly and strongly hold the line 1 but will effect connection of the line to the hook or other anchor 3.

In addition to the advantages thus far ascribed to my novel device, it will be noted that the device is simple and inexpensive in construction, is compact, and is generally well adapted to withstand exposure to the elements and rough usage.

I have specifically described the preferred embodiment of my invention in order to impart an exact understanding in all of its details. I do not desire however to be understood as limiting the improvements to the specific construction set forth, my invention being defined by my appended claim within the scope of which modifications may be made without departure from my invention.

Having described my invention what I claim and desire to secure by Letters Patent, is:—

A line fastener comprising a casing having an interiorly tapered portion, an annulus secured in the heel portion of the casing, a tubular line receiving member guided in the annulus and movable in the casing and having an enlarged portion in which are radially disposed apertures, balls arranged in said apertures of the line receiving member in contact with the tapered portion of the casing and adapted to engage a line in said member, a coiled extension spring mounted on the line receiving member in the casing and interposed between the enlargement of said member and the said annulus, and means whereby the casing may be connected to another object.

In testimony whereof I affix my signature.

PETER YANNETTA.